US007730035B2

(12) United States Patent
Berger et al.

(10) Patent No.: US 7,730,035 B2
(45) Date of Patent: Jun. 1, 2010

(54) METHOD, SYSTEM AND PROGRAM PRODUCT FOR MANAGING A FILE SYSTEM THAT INCLUDES AN ARCHIVE

(75) Inventors: Michael J. Berger, Toronto (CA); David K. McKnight, Newmarket (CA); Kushal S. Munir, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 534 days.

(21) Appl. No.: 11/296,729

(22) Filed: Dec. 7, 2005

(65) Prior Publication Data

US 2006/0167949 A1    Jul. 27, 2006

(30) Foreign Application Priority Data

Dec. 7, 2004    (CA)    .................................... 2489619

(51) Int. Cl.
G06F 7/00    (2006.01)
G06F 17/00    (2006.01)
(52) U.S. Cl. .................. 707/661; 707/667; 707/668; 707/822; 707/826; 711/161; 711/162
(58) Field of Classification Search .................. 707/10, 707/200, 204, 999.01, 999.2, 999.204; 711/161, 711/162
See application file for complete search history.

(56) References Cited

U.S. PATENT DOCUMENTS

| 5,630,131 | A | * | 5/1997 | Palevich et al. | ............. 717/108 |
|---|---|---|---|---|---|
| 5,956,733 | A | * | 9/1999 | Nakano et al. | ............... 707/204 |
| 6,041,334 | A | * | 3/2000 | Cannon | ....................... 707/204 |
| RE37,722 | E | | 5/2002 | Burnard et al. | |
| 6,427,149 | B1 | * | 7/2002 | Rodriguez et al. | ............. 707/10 |
| 6,557,039 | B1 | * | 4/2003 | Leong et al. | ................. 709/229 |
| 6,560,618 | B1 | | 5/2003 | Ims | |
| 6,615,244 | B1 | * | 9/2003 | Singhal | ....................... 709/213 |
| 6,618,736 | B1 | * | 9/2003 | Menage | ....................... 707/204 |
| 7,146,388 | B2 | * | 12/2006 | Stakutis et al. | ............... 707/204 |
| 2002/0120639 | A1 | * | 8/2002 | Basin et al. | .................. 707/204 |

(Continued)

OTHER PUBLICATIONS

*AVFS—A Virtual File System*; http://www.inf.bme.hu/~mszeredi/avfs/, printed on Nov. 4, 2004, p. 1.
*Commons Virtual File System*; http://jakarta.apache.org/commons/sandbox/vfs/, printed on Nov. 4, 2004, p. 1.

*Primary Examiner*—John E Breene
*Assistant Examiner*—Phong Nguyen
(74) *Attorney, Agent, or Firm*—Daniel McLoughlin, Esq.; Steven M. Greenberg, Esq.; Carey, Rodriguez, Greenberg & Paul, LLP

(57) ABSTRACT

An improved solution for managing a file system that includes an archive is provided. In particular, a request for a file system operation can be received and performed on an object that is stored in an archive. The file system operation can be received from a first computer and performed on the object on a second computer. Further, an archive manager can be included that manages an extensible set of archive handlers. In this case, each archive handler can implement a set of file system operations for archives of a particular archive type.

22 Claims, 4 Drawing Sheets

U.S. PATENT DOCUMENTS

2002/0147735 A1* 10/2002 Nir ........................... 707/200
2002/0178439 A1* 11/2002 Rich et al. ................. 717/174
2003/0225795 A1* 12/2003 Abdallah et al. ............ 707/200
2004/0003011 A1* 1/2004 Broussard et al. ........... 707/204

* cited by examiner

METHOD, SYSTEM AND PROGRAM PRODUCT FOR MANAGING A FILE SYSTEM THAT INCLUDES AN ARCHIVE

CROSS-REFERENCE TO RELATED APPLICATION

This application is related to and claims priority to Canadian Patent Application Serial No. 2,489,619, filed Dec. 7, 2004, entitled METHOD, SYSTEM AND PROGRAM PRODUCT FOR MANAGING A FILE SYSTEM THAT INCLUDES AN ARCHIVE, the entirety of which is incorporated herein by reference.

BACKGROUND OF THE INVENTION

1. Technical Field

The invention relates generally to managing a file system, and more particularly, to a solution for performing one or more file system operations on an archive in the file system and/or an object stored in the archive.

2. Background Art

A user can utilize a graphical user interface (GUI) to perform various file system operations (e.g., file management tasks) on objects (e.g., files, folders, etc.) in a file system. In general, the file system can be located at a computer that the user is operating or on a remote computer accessible via a network (e.g., a file server). Frequently, the user utilizes the GUI to browse the contents of the file system. To this extent, when the file system comprises a hierarchical file system, in which folders can include files and other folders, the GUI can present the user a tree based on the hierarchical structure that can be used to navigate the folders and/or display files included in the folders. Additionally, the GUI can provide different sets of file system operations for files and folders. For example, some GUIs assume that a folder can be "expanded" to view its contents while a file cannot. As a result, files may not be displayed in the tree. Rather, the files stored in a currently selected folder in the tree can be displayed in a separate display area.

In addition to browsing, the GUI can enable the user to perform search functions to locate a desired object. For example, a search can be performed based on all or a portion of the name of the desired object(s), a text search can be performed to locate object(s) whose contents include the specified text, and the like. Once a desired object in the file system has been located, the user can utilize the GUI to request the performance of one or more additional file system operations on the object. For example, the user can utilize the GUI to delete an object, move an object to another location, copy an object, rename an object, open an object, etc.

An archive is a particular type of file that stores one or more other files, often in a compressed form. An archive can be used to readily transfer a group of files, store files that may not need ready access, save storage space, etc. Further, the archive can define a hierarchical structure that includes one or more folders that include the files. In this case, when the files are subsequently extracted for access by a user, the folders are created and the files are placed in the appropriate folders.

To this extent, it is desirable that a user be able to perform the various file system operations on the object(s) stored in the archive. Current solutions that provide some ability to perform these operations are limited in one or more respects. For example, the archive can be one of numerous types of archives (e.g., a zip file, a cabinet file, a tape archive, a Java archive, etc.). Current solutions only support a subset of these formats and do not provide an extensible framework for readily adding support for additional archive types. Further, solutions that enable the performance of a file system operation on an object stored in an archive located on a remote system require the archive to be copied to the local system, where the file system operation is performed. This requirement makes performance of the file system operation less efficient, and adds to the amount of communications required over a network.

In light of this, a need exists for an improved solution for managing a file system that includes an archive. In particular, there exists a need for a solution in which support for various archive types can be readily added/modified. Further, there exists a need for a solution in which a file system operation on an object in an archive can be performed on the system on which the archive is located, regardless of the system on which the request is generated.

SUMMARY OF THE INVENTION

The invention provides an improved solution for managing a file system that includes an archive. In one embodiment, the invention performs a file system operation that is requested from a remote computer on an archive and/or one or more objects stored in the archive. The file system operation is performed on the computer that includes the file system wherein the archive is located. In another embodiment, the invention provides an archive manager that can perform file system operations on archives comprising an extensible set of archive types. To this extent, the archive manager can manage a set of archive handlers in which each archive handler can perform file system operations on an archive and/or object within the archive of a particular archive type. When a new archive handler is obtained, the archive manager can associate it with the corresponding archive type, and select it to perform a requested file system operation on an archive that is the corresponding archive type. As a result, the invention provides a solution that enables the local performance of file system operations without transferring an archive over a network. Further, the invention enables support for performing file system operations on archives to be included for an extensible set of archive types.

A first aspect of the invention provides a method of managing a file system that includes an archive, the method comprising: receiving, on a first computer, a request from a second computer to perform a file system operation; determining an archive type for the archive; selecting an archive handler based on the archive type; and performing the file system operation on the first computer, wherein the archive handler performs at least a portion of the file system operation on the archive.

A second aspect of the invention provides a method of managing a file system that includes an archive, the method comprising: receiving a request to perform a file system operation; and performing the file system operation, wherein the performing step includes: providing the file system operation and the archive to an archive manager; and performing the file system operation on the archive using the archive manager, wherein the archive manager can perform the file system operation on an extensible set of archive types.

A third aspect of the invention provides a system for managing a file system that includes an archive, the system comprising: a processing system for performing a file system operation on an object stored in the file system; an archive manager for managing an extensible set of archive handlers; and at least one archive handler for performing the file system operation on an object stored in the archive.

A fourth aspect of the invention provides a program product stored on a computer-readable medium, which when executed, manages a file system that includes an archive, the program product comprising: program code for receiving, on a first computer, a request from a second computer to perform a file system operation; program code for determining an archive type for the archive; program code for selecting an archive handler based on the archive type; and program code for performing the file system operation on the first computer, wherein the archive handler performs at least a portion of the file system operation on the archive.

A fifth aspect of the invention provides a file system explorer comprising: a display system for displaying at least a portion of a file system that includes an archive; a request system for receiving a request to perform a file system operation; a processing system for performing the file system operation on an object stored in the file system; an archive manager for managing an extensible set of archive handlers; and at least one archive handler for performing the file system operation on an object stored in the archive.

A sixth aspect of the invention provides a method of deploying an application for managing a file system that includes an archive, the method comprising: providing a computer infrastructure being operable to: receive, on a first system, a request from a second system to perform a file system operation; determine an archive type for the archive; select an archive handler based on the archive type; and perform the file system operation on the first computer, wherein the archive handler performs at least a portion of the file system operation on the archive.

A seventh aspect of the invention provides computer software embodied in a propagated signal for managing a file system that includes an archive, the computer software comprising instructions to cause a computer system to perform the following functions: receive, on a first system, a request from a second system to perform a file system operation; determine an archive type for the archive; select an archive handler based on the archive type; and perform the file system operation on the first computer, wherein the archive handler performs at least a portion of the file system operation on the archive.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings

DETAILED DESCRIPTION OF THE INVENTION

As indicated above, the invention provides an improved solution for managing a file system that includes an archive. In one embodiment, the invention performs a file system operation that is requested from a remote computer on an archive and/or one or more objects stored in the archive. The file system operation is performed on the computer that includes the file system wherein the archive is located. In another embodiment, the invention provides an archive manager that can perform file system operations on archives comprising an extensible set of archive types. To this extent, the archive manager can manage a set of archive handlers in which each archive handler can perform file system operations on an archive and/or object within the archive of a particular archive type. When a new archive handler is obtained, the archive manager can associate it with the corresponding archive type, and select it to perform a requested file system operation on an archive that is the corresponding archive type. As a result, the invention provides a solution that enables the local performance of file system operations without transferring an archive over a network. Further, the invention enables support for performing file system operations on archives to be included for an extensible set of archive types.

It is understood that, as used herein, the term "object" refers to any type of artifact included in a typical file system, such as a hierarchical file system. To this extent, object includes a file (e.g., a collection of data) stored in the file system, a folder (directory) that can be used to separate the listing of files, a drive that can comprise a virtual drive defined by a starting folder or a physical storage unit used to store file system artifacts, etc. Further, it is understood that the term "archive" is used to describe any file that includes one or more other files within its data. An archive is commonly used to store file(s) not frequently accessed, transfer one or more files from one location to another, backup file(s), etc. To this extent, the data for the file(s) included in the archive may be compressed to reduce the amount of storage space required. Additionally, the archive can comprise one or more folders that define a hierarchical structure for folder(s) that include the file(s), and which can be recreated when the file(s) in the archive are extracted. Illustrative archive types include a zip file, a cabinet file, a tape archive, a Java archive, etc. However, it is understood that the invention is not limited to these archive types.

Figure 1:
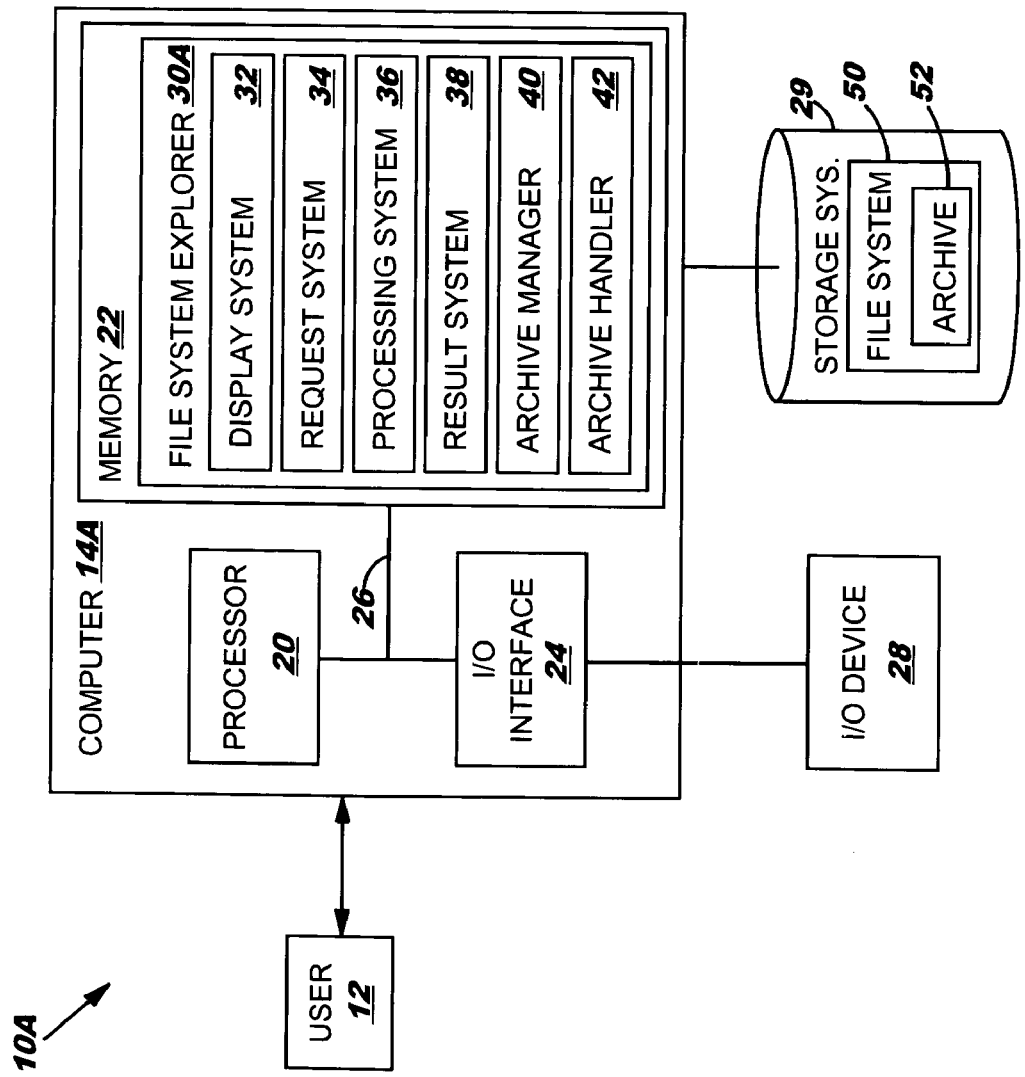
FIG. 1 shows an illustrative system for managing a file system that includes an archive according to one embodiment of the invention.

Turning to the drawings, FIG. 1 shows an illustrative system 10A for managing a file system 50 that includes an archive 52. In particular, a user 12 can utilize a file system explorer 30A, which enables user 12 to request various file system operations to be performed on file system 50 and/or archive 52. For example, illustrative file system operations include browsing, e.g., displaying and/or navigating through all or a part of file system 50, deleting, copying, moving, renaming, opening, creating, searching, etc., an object (e.g., archive 52) in file system 50, etc.

Additionally, as discussed further below, file system explorer 30A enables user 12 to request to perform one or more file system operations on an object stored in archive 52. In response to the request, file system explorer 30A can perform the file system operation on the object.

File system explorer 30A is shown implemented on computer 14A as computer program code. To this extent, computer 14A is shown including a processor 20, a memory 22, an input/output (I/O) interface 24, and a bus 26. Further, computer 14A is shown in communication with an external I/O device/resource 28 and a storage system 29. In general, processor 20 executes computer program code, such as file system explorer 30A, that is stored in memory 22 and/or storage system 29. While executing computer program code (e.g., file system explorer 30A), processor 20 can read and/or write data, such as one or more objects in file system 50, to/from memory 22, storage system 29, and/or I/O interface 24. Bus 26 provides a communication link between each of the components in computer 14A. I/O device 28 can comprise any device that enables user 12 to interact with computer 14A (e.g., keyboard, pointing device, display, etc.).

Computer 14A is only representative of various possible combinations of hardware. For example, processor 20 may comprise a single processing unit, or be distributed across one or more processing units in one or more locations, e.g., on a client and server. Similarly, memory 22 and/or storage system 29 can comprise any combination of various types of data storage and/or transmission media that reside at one or more physical locations. Further, I/O interface 24 can comprise any system for exchanging information with one or more I/O devices 28. Still further, it is understood that one or more additional components (e.g., system software, math co-processor, etc.) not shown in FIG. 1 can be included in computer 14A. To this extent, computer 14A can comprise any type of computing device such as a network server, a desktop computer, a laptop, a handheld device, a mobile phone, a pager, a personal data assistant, etc. However, if computer 14A comprises a handheld device or the like, it is understood that one or more I/O devices 28 (e.g., a display) and/or storage system 29 could be contained within computer 14A, not externally as shown.

As discussed further below, file system explorer 30A provides an improved solution for managing file system 50, which includes archive 52. To this extent, file system explorer 30A is shown including a display system 32 for displaying at least a portion of file system 50, a request system 34 for receiving a request to perform a file system operation, a processing system 36 for performing the file system operation on an object stored in file system 50, and a result system 38 for receiving a result of the file system operation. Further, file system explorer 30A is shown including an archive manager 40 that manages an extensible set (zero or more) of archive handlers 42, and at least one archive handler 42 that performs at least a portion of a file system operation on an object stored in archive 52. Operation of each of these systems is discussed further below. However, it is understood that some of the various systems shown in FIG. 1 can be implemented independently, combined, and/or stored in memory for one or more separate computers 14A that communicate over a network. Further, it is understood that some of the systems and/or functionality may not be implemented, or additional systems and/or functionality may be included as part of system 10.

Figure 2:
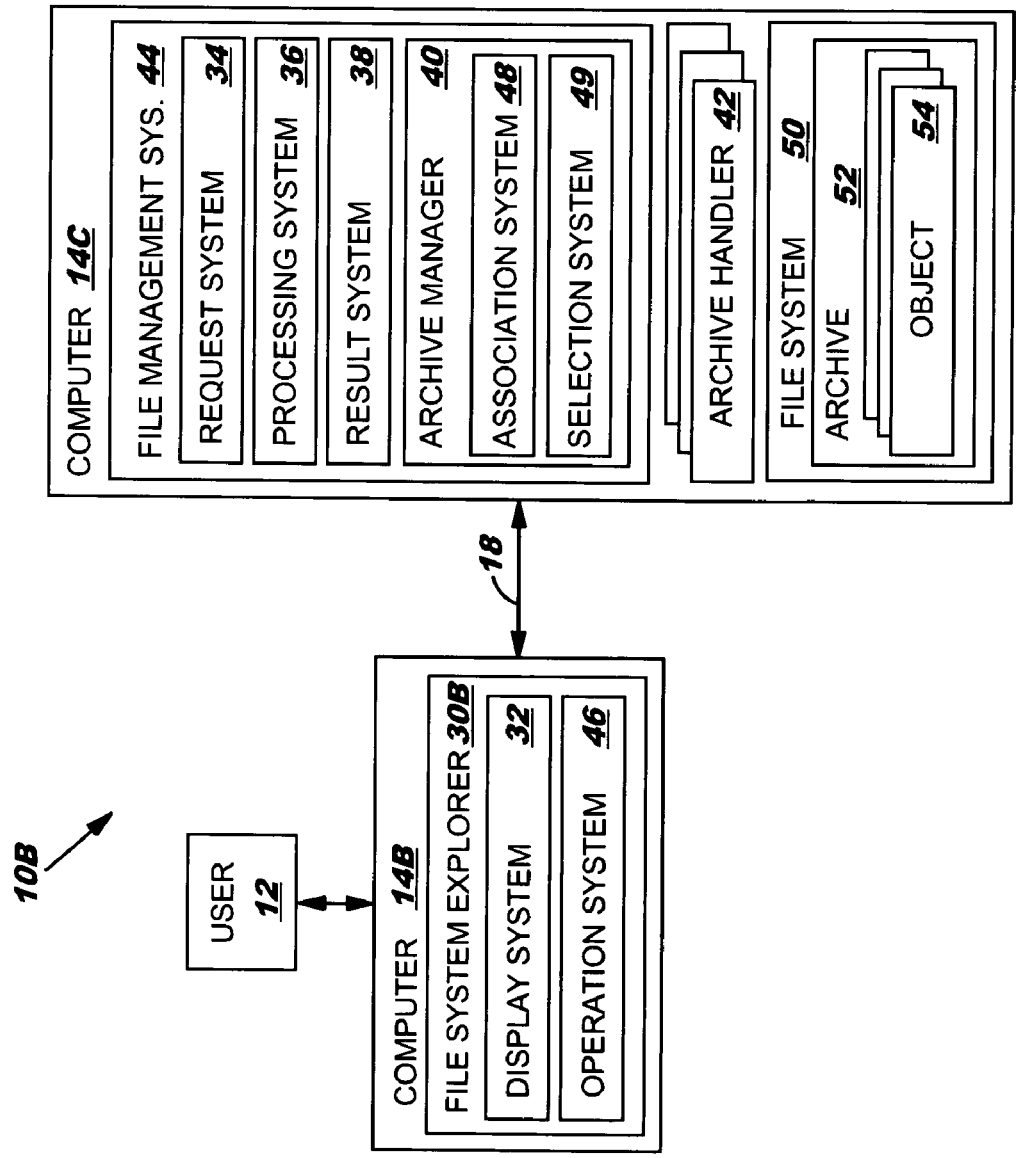
FIG. 2 shows an alternative system for managing a file system that includes an archive according to another embodiment of the invention.

Display system 32 can display at least a portion of file system 50 to user 12 in a known manner. Further, user 12 can generate a request for a file system operation by utilizing I/O device 28 (e.g., a pointing device) while viewing file system 50. The request can be received by request system 34 and processed by processing system 36. Alternatively, request system 34 can receive a request generated at a remote computer. For example, FIG. 2 shows an alternative system 10B for managing a file system 50 that includes an archive 52. In this case, user 12 operates computer 14B to request that a file system operation be performed on one or more objects stored in file system 50, which is located at a second computer 14C, remote from computer 14B. In particular, user 12 can utilize file system explorer 30B to request the desired file system operation. The request can be communicated over a network 18 to computer 14C, where it can be processed by a file management system 44.

In one embodiment, file system explorer 30B and file management system 44 are implemented as part of the Remote System Explorer (RSE) software component made available by International Business Machines Corp. of Armonk, N.Y. In this case, computers 14B-C can comprise different platforms, and file system 50 can comprise a different type of file system from that implemented on computer 14B. For example, computers 14B-C could comprise any combination of a Windows-based file system, a Linux-based file system, an iSeries system, etc.

In any event, each computer 14B-C can include an I/O device 28 (FIG. 1), such as a network adapter, an I/O port, a modem, etc., that enables computer 14B to communicate with computer 14C over network 18. Network 18 can comprise any combination of various types of communications links. For example, network 18 can comprise addressable connections that may utilize any combination of wireline and/or wireless transmission methods. In this instance, the computing devices (e.g., computers 14B-C) may utilize conventional network connectivity, such as Token Ring, Ethernet, WiFi or other conventional communications standards. Further, network 18 can comprise one or more of any type of network, including the Internet, a wide area network (WAN), a local area network (LAN), a virtual private network (VPN), etc. Where communications occur via the Internet, connectivity could be provided by conventional TCP/IP sockets-based protocol, and a computing device could utilize an Internet service provider to establish connectivity to the Internet.

As discussed further below, in system 10B, file system explorer 30B includes a display system 32 for displaying at least a portion of file system 50 and an operation system 46 for providing a request to perform a file system operation on one or more objects in file system 50 to file management system 44. File management system 44 includes a request system 34 for receiving the request, a processing system 36 for performing the file system operation on the one or more objects in file system 50, and a result system 38 for receiving a result of the file system operation. Further, file management system 44 includes an archive manager 40 for managing an extensible set of archive handlers 42. Each archive handler 42 implements a set of file system operations for archive 52 and/or object(s) 54 stored in archive 52. To this extent, each archive handler 42 can support a particular type of archive 52, and can be implemented apart from file management system 44. In this case, archive manager 40 can include an association system 48 for associating each archive handler 42 with a corresponding archive type, and a selection system 49 for selecting an archive handler 42 based on the archive type.

In order to send and process requests between file system explorer 30B and file management system 44, computer 14C can initially establish a remote connection with computer 14B. The remote connection can be established using any solution. For example, computer 14B can request the remote connection in response to an action by user 12 such as selection of a mapped network drive, selection of computer 14C from a list of available computers, etc. Additionally, user 12 and/or computer 14B can provide identification, such as a user name and password, to computer 14C in order to verify that user 12 has access to file system 50. When access is verified, communications between file management system 44 and file system explorer 30B can occur, and file management system 44 can perform one or more file system operations on file system 50 in response to a request generated by user 12.

Figure 3:
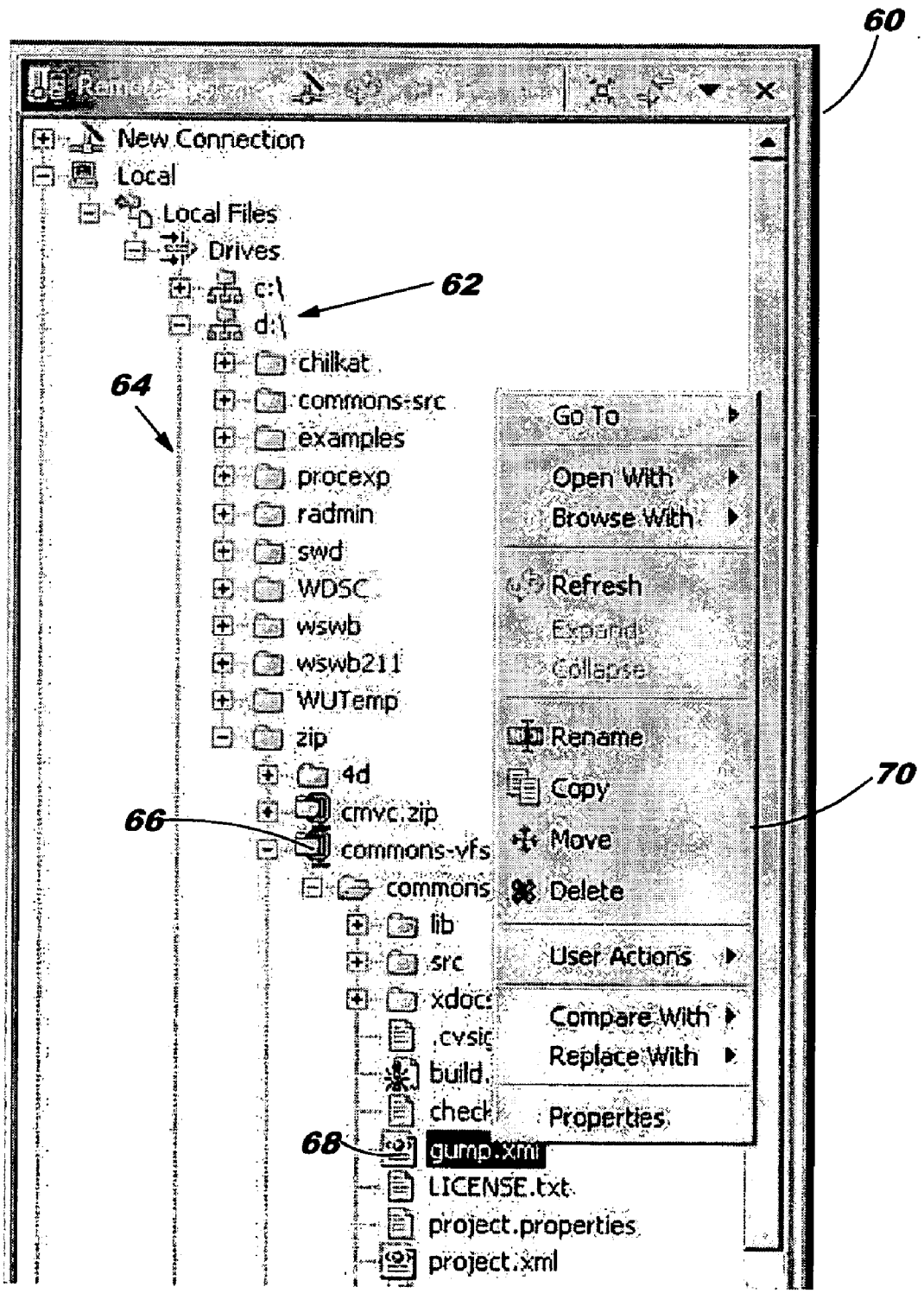
FIG. 3 shows an illustrative display area for displaying at least a portion of the file system.

User 12 generates the request by utilizing file system explorer 30B. To illustrate the processing of a request in system 10B, the various requests associated with the "browse" file system operation are discussed. In general, "browsing" comprises viewing and navigating through the contents of file system 50. Initially, user 12 must request to view some portion of file system 50. To this extent, display system 32 can display at least a portion of file system 50 to user 12. For example, FIG. 3 shows an illustrative display area 60 that can be generated by display system 32 (FIG. 2). In one embodiment, display system 32 displays a node 62 or the like that represents a mapped network drive, which corresponds to a start location (e.g., folder) within file system 50 (FIG. 2). User 12 (FIG. 2) can select node 62 and request the performance of a file system operation. As a result of performance of the file system operation on computer 14C (FIG. 2), the contents of display area 60 may be modified.

For example, referring to both FIGS. 2 and 3, user 12 can request that the contents of the folder corresponding to node 62 be displayed (e.g., by double-clicking node 62). Operation system 46 can receive the requested file system operation and provide the request to file management system 44 over network 18. Request system 34 can receive the request, and processing system 36 can perform the file system operation on file system 50. In this case, processing system 36 can obtain a list of the object(s) stored in the folder corresponding to node 62. Result system 38 can receive the list from processing system 36, and provide the list as a result of the file system operation to operation system 46 over network 18. Operation system 46 can then provide the result to display system 32, which can update the displayed portion of file system 50 based on the result. In particular, display system 32 can display nodes 64 for folders that are stored in the starting location in file system 50.

Returning to FIG. 2, the invention enables the performance of a file system operation on archive 52 and/or object 54 on computer 14C. To this extent, when request system 34 receives a request for a file system operation to be performed on archive 52 and/or object 54, request system 34 can provide the file system operation to archive manager 40. Archive manager 40 can perform the file system operation on archives and objects stored in archives, which comprise one of an extensible set of archive types. For some file system operations, such as a search of the contents of archive 52, request system 34 can further provide archive 52 to archive manager 40. For other file system operations, such as renaming object 54, request system 34 can provide both archive 52 and object 54 to archive manager 40. In any event, archive manager 40 can determine if archive 52 comprises one of the extensible set of archive types, and if so, perform the file system operation.

In one embodiment, archive manager 40 manages an extensible set of archive handlers 42, in which each archive handler 42 can perform a set of file system operations on archives 52 and objects 54 stored in archives 52 of a particular archive type. In this case, when a new archive handler 42 is to be added to the set of archive handlers 42, association system 48 can obtain the new archive handler 42 and an archive type that corresponds to the new archive handler 48. Association system 48 can then associate the new archive handler 42 with the corresponding archive type.

There are numerous solutions with which an archive handler 42 can be associated with a corresponding archive type. For example, a file extension can be used to identify the particular archive type of a file. Illustrative file extension include ".zip" for a zip file, ".cab" for a cabinet file, ".tar" for a tape archive, and ".jar" for a Java archive. Additionally or in the alternative, a portion of a file can be read to determine if it comprises one of the set of archive types. For example, file formats frequently include data at the beginning of the file to indicate the type of file and/or a version of the file type. This information can be used by request system 34 and/or archive manager 40 to determine that the file system operation is to be performed on a file that is an archive and/or to determine the corresponding archive type for archive 52.

In any event, selection system 49 can determine an archive type for archive 52 and select archive handler 42 based on the archive type. Once selected, the file system operation and at least one of archive 52 and object 54 can be provided to archive handler 42. Archive handler 42 can perform the file system operation on archive 52 and/or object 54. Subsequently, archive handler 42 can return a result of the file system operation to archive manager 40, which can provide the result to result system 38 for processing as described above.

Prior to performing the file system operation, one or more additional actions may be required. In one embodiment, archive handler 42 can first authenticate user 12. For example, archive 52 may comprise a password or the like that is required in order to perform one or more of the file system operations on archive 52 and/or object 54 (e.g., edit object 54). In this case, archive handler 42 can obtain the password from user 12 prior to performing the file system operation. Similarly, archive handler 42 may initially determine a version of the archive type for archive 52. For example, archive handler 42 may support archive types of version two or lower, but archive 52 could comprise version three of the archive type. In this case, archive handler 42 can return an error indicating that the version of the archive type is not supported.

As mentioned previously, archive handler 42 can implement a set of file system operations for archive 52 and/or object 54 within archive 52. However, it is understood that one or more file system operations for archive 52 can be implemented by processing system 36. For example, processing system 36 can copy archive 52, move archive 52, rename archive 52, and the like, as with any other object in file system 50.

To this extent, the set of file system operations implemented by archive handler 42 can comprise those file system operations that require access to/modification of the contents (e.g., data) of archive 52. For example, the set of file system operations can include operations performed on one or more objects 54 stored in archive 52 such as a browse operation, a text search operation, creation of archive 52, etc. Similarly, the set of file system operations can comprise operations performed on a particular object 54 in archive 52, such as an add operation, a delete operation, a rename operation, an extract operation, a get properties operation, etc.

Further details of the invention are now discussed with reference to several illustrative file system operations. As noted above, the browse operation comprises a common file system operation. Referring again to FIG. 3 in conjunction with FIG. 2, user 12 can browse file system 50. During browsing, processing system 36 and/or operation system 46 can generate a hierarchical structure that comprises a node 62 for the start location and subsequent nodes 64 corresponding to object(s) stored within the start location, a node 66 corresponding to an object stored within a folder stored within the start location, etc. Display system 32 can display the hierarchical structure to user 12 in display area 60. It is understood that the hierarchical structure can be generated "on demand." That is, processing system 36 and/or operation system 46 can determine and add object(s) stored within a particular folder only after user 12 has requested such information. Alternatively, some or all of hierarchical structure can be generated at once, while display system 32 only displays the nodes requested by user 12.

In any event, while browsing, user 12 may select to view the contents of a folder that includes archive 52. In response, processing system 36 can add node 66 to the hierarchical structure for archive 52. Further, processing system 36 can determine that archive 52 comprises an archive type that can be processed using archive manager 40. For example, processing system 36 can query archive manager 40 to determine if archive 52 comprises one of the set of archive types, or the like. In any event, when archive 52 comprises an archive type for which file system operations can be performed using archive manager 40, processing system 36 can include an indication that archive 52 includes object(s) on which file system operation(s) can be performed. As a result, display system 32 can include an indication that node 66 is expandable, e.g., the object(s) stored in archive 52 can be browsed by user 12. Display system 32 can use any known solution for displaying such an indication, for example, node 66 can comprise a plus sign adjacent to the icon as shown for nodes 64.

When user 12 requests to browse the contents of archive 52 (e.g., by double-clicking node 66), processing system 36 can forward the request to archive manager 40. Selection system 49 within archive manager 40 can select an appropriate archive handler 42 based on the archive type for archive 52, and archive handler 42 can generate a virtual hierarchical structure for archive 52. The virtual hierarchical structure is based on the hierarchical structure that would be generated if the object(s) stored in archive 52 were extracted. To this extent, the hierarchical structure can comprise only one or more files, or can comprise one or more folders, each including any number of files and/or folders. In any event, archive handler 42 can determine an efficient solution for generating the virtual hierarchical structure for the particular archive type, and generate the virtual hierarchical structure using this solution. As a result, the virtual hierarchical structure can be generated "on demand" in which only the contents for a single level within archive 52 are obtained or all at once.

Once generated, archive handler 42 can return the requested portion of the virtual hierarchical structure as a result of the file system operation. For example, processing system 36 can request the objects 54 stored in a particular folder defined in archive 52. In response, archive handler 42 can generate the virtual hierarchical structure, and return a portion of the virtual hierarchical structure that corresponds to the objects 54 stored in the folder. Subsequently, processing system 36 and/or operation system 46 can add the returned virtual hierarchical structure for archive 52 to the hierarchical structure, and display system 32 can display the updated hierarchical structure, which includes the virtual hierarchical structure. User 12 then can browse the contents of archive 52 in an identical manner (from the perspective of user 12) as for the start location. For example, user 12 can request to expand one or more virtual folders that are included in archive 52.

While browsing archive 52, a virtual node 68 that corresponds to object 54 may be added to the virtual hierarchical structure and displayed in display area 60. When displayed, user 12 can request to perform one or more file system operations (e.g., delete, rename, extract, open, etc.) on object 54 using display area 60. For example, user 12 could "right-click" on node 68, and operation system 46 can generate a popup window 70 that comprises a set of file system operations that can be performed on object 54 and enables user 12 to request one or more of the file system operations. It is understood, however, that this is only illustrative of the possible solutions that user 12 can utilize to request a file system operation. For example, user 12 can "drag and drop" node 68 to request that the corresponding object 54 be moved/copied to a new location.

In any event, some or all of the file system operation can be performed by a corresponding archive handler 42, processing system 36, and/or a system (e.g., software product) for managing the file type of object 54. To this extent, archive handler 42 can be used to perform only a portion of the requested file system operation. For example, when user 12 requests to open object 54, archive handler 52 can extract object 54 to a temporary folder and provide the extracted object 54 to a corresponding system for display and/or manipulation. Subsequently, if user 12 makes one or more changes to the extracted object 54, archive handler 52 can modify object 54 stored within archive 52 with the updated version. Similarly, when user 12 requests to copy object 54 from archive 52 to a location outside of archive 52, archive handler 42 can extract a copy of object 54 from archive 52, and provide it to processing system 36, which can copy object 54 to the desired location.

In addition to browsing, user 12 can perform a search to retrieve only the desired file system object(s). For example, user 12 can request to display all file system objects whose name matches a particular filter (e.g., "*.lwp", "test*.*", etc.). In this case, processing system 36 can perform the search for those file system objects that are not an archive. Additionally, for each archive 52 within the search area, processing system 36 can provide the search to archive manager 40, which in turn can select an appropriate archive handler 42 for performing the search on the contents of the archive 52. In this case, each archive handler 42 can determine the virtual hierarchical structure for the archive 52, and locate any object(s) 54 that match the particular filter.

In addition to or alternative to an object name filter, user 12 can request a text search operation. The text search operation comprises a search using a filter that specifies the selection of object(s) based on the presence of a text string in the data for the object. As stated above, archive handler 42 can perform the search on object(s) 54 stored in an archive 52 of the corresponding archive type. To this extent, archive handler 42 can perform the search using any desired solution. For example, when the object(s) 54 stored in archive 52 are not compressed or otherwise formatted, archive handler 42 can search the data of archive 52 for the presence of the text string. However, when the object(s) 54 are compressed, archive handler 42 can first decompress each object 54 before performing the search. Alternatively, archive handler 42 can modify the text string to a compressed version of the text string, and then search the object(s) 54 for the presence of the compressed version of the text string. Should a match be found, archive handler 42 can subsequently determine the corresponding object 54 within which the compressed text string was present, and whether its presence is due to the presence of the original text string in the decompressed object 54.

The invention provides additional flexibility when performing file system operations on archive 52 and/or object 54. For example, object 54 could comprise a second archive that is included within archive 52. Further, object 54 can comprise a different archive type from that of archive 52. In this case, archive manager 40 can initially select archive handler 42 to perform a requested file system operation on object 54. If the file system operation requires access to the contents of object 54 (the second archive) archive handler 42 can provide object 54 and the corresponding file system operation to archive manager 40 for processing. Subsequently, archive manager 40 can select a second archive handler 42 for performing the file system operation on object 54, and the results can be passed back to the first archive handler 42. In this manner, a file system operation can be performed on any number of archives and/or archive types stored in archive 52.

In addition to supporting common file system operations, one or more new file system operations can be implemented using the invention. For example, as discussed above, each archive handler can support an archive create operation. In this case, user 12 can select a start location (e.g., a folder) to create a new archive 52. In response, archive handler 42 can create a new archive 52 that includes the start location and the file system objects stored therein.

Further, a new file system operation can be provided that enables user 12 to perform an "archive copy" and/or "archive move." In this case, a start location in file system 50 on a first computer 14C can be selected, and user 12 can request an archive copy/move for the object(s) stored therein. In response, archive handler 42 can create a new archive 52 that includes the start location and the object(s). The new archive 52 can be transferred over network 18 to a second computer 14B. On the second computer 14B, an archive handler 42 that processes the same archive type can extract the contents of the new archive 52 into a destination location on a second file system for the second computer 14B. In this manner, a group of files/folders can be efficiently transferred over network 18. In particular, rather than transferring numerous files, a single file can be copied. Additionally, archive 52 can comprise a compressed version of the object(s) 54, thereby reducing the amount of data that is communicated over network 18.

Similarly, the file system operations discussed herein could be combined to provide an "archive convert" operation, in which an archive comprising one archive type (e.g., a zip file) is converted to an archive comprising a second archive type (e.g., a tape archive file). In this case, archive manager 40 can request a first archive handler 42 to extract the object(s) 54 included in archive 52. Subsequently, archive manager 40 can request a second archive handler 42 to create a new archive 54 that includes the extracted object(s) 54. Further, archive manager 40 can delete any temporary files, the initial archive 52, etc.

Figure 4:
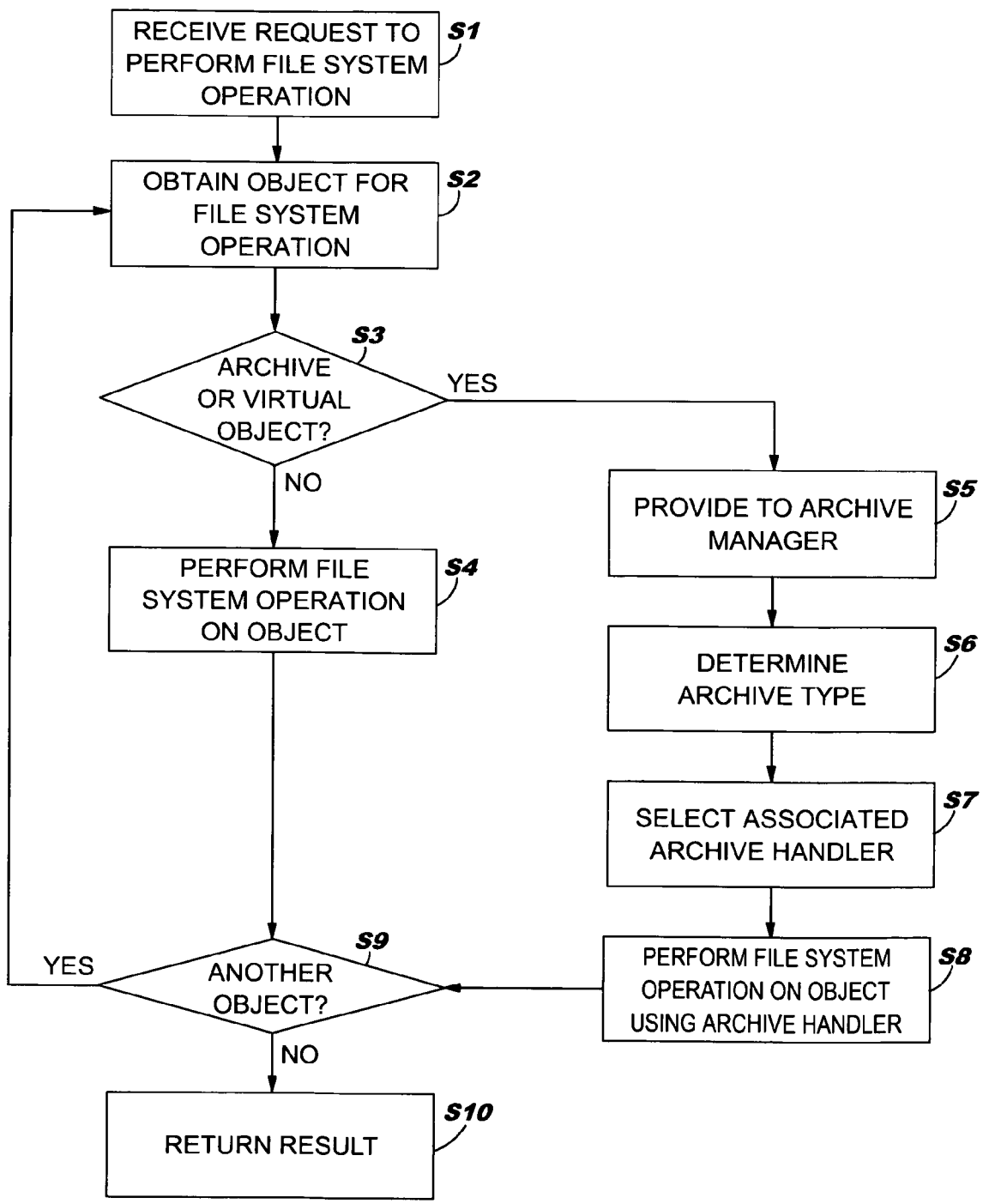
FIG. 4 shows illustrative method steps for performing a file system operation according to one embodiment of the invention.

As discussed herein, the invention further provides a method of managing file system 50 that includes archive 52. For example, FIG. 4 shows illustrative method steps for performing a file system operation according to one embodiment of the invention, which can be implemented by the various systems shown and discussed with reference to FIGS. 1 and 2. In particular, in step S1, request system 34 receives a request to perform the file system operation. In step S2, processing system 36 can obtain a file system object for the file system operation. In step S3, processing system 36 can determine if the file system object comprises an archive 52 or a virtual object 54 (e.g., an object within archive 52). If the file system object is not one of these types, then in step S4, processing system 36 performs the file system operation on the file system object.

Otherwise, in step S5, processing system 36 provides the file system operation and archive 52 to archive manager 40. In step S6, selection system 49 determines an archive type for archive 52, and in step S7, selection system 49 selects the archive handler 42 that is associated with the archive type. In step S8, archive handler 42 performs the file system operation on archive 52. In either case, after the file system operation has been performed for the file system object, in step S9, processing system 36 can determine if the file system operation needs to be performed on another file system object. If so, flow returns to step S2. Otherwise, flow passes to step S10, in which processing system 36 provides a result of the file system operation to result system 38.

It should be appreciated that the teachings of the present invention could be offered as a business method on a subscription or fee basis. For example, file management system 44 (FIG. 2) and/or computer 14C (FIG. 2) could be created, maintained, supported and/or deployed by a service provider that offers the functions described herein for customers. That is, a service provider could offer to manage a file system that includes an archive as described above. It is understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized.

The present invention also can be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of managing a file system that includes an archive, the method comprising:
   receiving, on a first computer, a request from a second computer to perform a file system operation;
   determining an archive type for the archive;
   selecting an archive handler based on the archive type; and
   performing the file system operation on the first computer, wherein the archive handler performs at least a portion of the file system operation on the archive.

2. The method of claim 1, wherein the file system operation comprises a browse operation corresponding to a start location in the file system, and wherein the performing step includes:
   generating a hierarchical structure for the start location that includes a node for the archive; and
   adding a virtual hierarchical structure for the archive to the hierarchical structure using the archive handler, wherein the virtual hierarchical structure includes a virtual node for an object stored in the archive.

3. The method of claim 1, wherein the request comprises a search operation with a filter, and wherein the performing step includes selecting an object stored in the archive based on the filter.

4. The method of claim 1, further comprising providing a result of the file system operation to the second computer.

5. The method of claim 1, further comprising establishing a remote connection with the second computer prior to the receiving step.

6. The method of claim 1, wherein the performing step includes providing the file system operation and at least one of the archive and an object stored in the archive to an archive manager, wherein the archive manager performs the determining and selecting steps.

7. The method of claim 1, further comprising:
obtaining the archive handler and the archive type that corresponds to the archive handler; and
associating the archive handler with the archive type.

8. The method of claim 1, wherein the file system operation comprises a text search operation.

9. The method of claim 1, wherein the object comprises a second archive.

10. The method of claim 1, wherein the performing step includes authenticating a user prior to performing the at least a portion of the file system operation on the archive.

11. The method of claim 1, wherein the file system operation comprises an archive create operation.

12. A method of managing a file system that includes an archive, the method comprising:
receiving a request to perform a file system operation; and
performing the file system operation, wherein the performing step includes:
providing the file system operation and the archive to an archive manager; and
performing the file system operation on the archive using the archive manager, wherein the archive manager can perform the file system operation on an extensible set of archive types.

13. The method of claim 12, wherein the file system operation is performed on an object stored in the archive.

14. The method of claim 13, wherein the performing the file system operation on the archive step includes authenticating a user prior to performing the file system operation on the object.

15. The method of claim 12, wherein the performing the file system operation on the archive step includes:
determining an archive type for the archive; selecting an archive handler based on the archive type; and
performing the file system operation on the archive using the archive handler.

16. The method of claim 15, further comprising:
obtaining the archive handler and a corresponding archive type; and
associating the archive handler with the corresponding archive type, wherein the selecting step is based on the association.

17. The method of claim 15, wherein the archive handler implements a set of file system operations for archives having the archive type.

18. The method of claim 17, wherein the set of file system operations includes a text search operation, an add operation, a delete operation, a rename operation, an extract operation, and a browse operation.

19. The method of claim 17, wherein the set of file system operations includes an archive create operation.

20. The method of claim 12, further comprising receiving a result of the file system operation from the archive manager.

21. The method of claim 12, wherein the request is received from a second computer remote from the file system.

22. The method of claim 12, further comprising:
displaying at least a portion of the file system; and
updating the displayed portion of the file system based on a result of the file system operation.

* * * * *